Patented May 8, 1928.

UNITED STATES PATENT OFFICE.

1,668,879

HARLAN L. TRUMBULL, OF HUDSON, OHIO, AND JOHN B. DICKSON, OF NORTHAMPTON, MASSACHUSETTS, ASSIGNORS TO THE B. F. GOODRICH COMPANY, OF NEW YORK, N. Y., A CORPORATION OF NEW YORK.

METHOD FOR THE DISPERSION OF RUBBER INTO A COLLOIDAL SUBSTANCE.

No Drawing. Application filed April 23, 1926. Serial No. 104,198.

This invention relates to the art of producing a mixture of rubber and a colloid, and is especially applicable to the production of a mixture of rubber and a hydrophilic colloid in which the rubber is dispersed in the hydrophilic colloid, the latter constituting a continuous phase.

Our object is to provide a convenient, economical and dependable method for producing a mixture of the character described, and to provide a product in which the proportion of the rubber dispersed in the colloid is such as to adapt the mixture for uses such as the production of an artificial rubber latex by thinning with water a mixture of the character described containing finely dispersed raw rubber.

The present application describes the same general subject matter as does our prior Patent No. 1,513,139, granted October 28, 1924, but is particularly directed to an alternative process described but not claimed in this prior patent.

In carrying out the process claimed in our prior patent, to produce, for example, a dispersion of rubber in a hydrophilic colloid, such as glue, casein, gluten, sodium resinate, gum arabic, or similar material, such colloid is first mixed with water to produce a paste, preferably of high viscosity, and a quantity of this paste is placed upon a tight rubber mill or similar device. To the paste, the rubber, preferably first softened, as by mastication or by the addition of a softening agent such as paracumarone, or other tacky softener, is added in small pieces and is gradually worked into the viscous paste of the hydrophilic colloid. In order to avoid inversion of phase in the mixture which is formed, it is desirable to add the rubber slowly and to compensate for evaporation by frequent additions of water in small quantity.

In the alternative process of our prior patent, which forms the subject-matter of this application, in one example, such large amounts of rubber, preferably rubber which has been softened, are added to a quantity of viscous paste of a hydrophilic colloid which has been prepared in the manner above described, as to produce a dispersion having an inverted phase from that desired in the finished dispersion, that is, giving a dispersion of hydrophilic colloid in rubber. The latter dispersion differs from the water dispersable type in that it is not readily wet by water, it is more viscous, and it can usually be confined to one roll of a rubber mill instead of two.

This batch of rubber, in which the hydrophilic colloid is in the disperse phase, is now converted into the water-dispersable type of dispersion by working or admixing a thin bank of hydrophilic colloid paste into the batch, that is, adding to the batch such amounts of the colloidal paste as will with mastication produce an inversion of phase of the rubber and colloid paste bringing the latter into continuous phase.

Following the procedure above outlined, it is possible to prepare dispersions of rubber in a paste of a hydrophilic colloid in which the ratio of rubber to total solids is of the same order of magnitude as in rubber latex, concentrations of rubber from zero to more than 80% being obtainable. By the addition of water to the putty-like mass which is eventually produced in the above-described process, and in which all the rubber has been dispersed into very small particles, it is possible to prepare a colloidal solution closely resembling rubber latex in its physical properties.

The addition of small amounts of certain salts and bases, such as sodium carbonate, sodium borate and ammonium hydroxide, or other peptizing agent, to the water phase, has been found advisable in certain cases, such bases or salts serving to make the emulsion more stable.

The method described may be used for producing mixtures containing compounding ingredients in addition to those above mentioned, as by milling such ingredients into the rubber before the latter is dispersed in the colloid, or such ingredients may be added to the mixture of rubber and colloid after said mixture has been prepared as above described.

The mixture of the rubber in such a colloid where the latter is the continuous phase, has many uses which will occur to those familiar with the rubber industry, an example being the coating or impregnating of materials, the latex-like form of the product being especially valuable for coating or impregnating fibrous materials.

An advantage of the non-liquid product above described, comprising the rubber as a disperse phase and the colloid as a continuous phase, is that it may be conveniently handled or shipped, either in the plastic form in which it comes from the mill, or after being dried.

By the term rubber as herein employed, it is intended to include caoutchouc, gutta-percha, balata and similar rubber-like gums, either in the crude form, or in the vulcanized state, or in the so-called reclaimed condition.

Various modifications may be resorted to without departing from the scope of our invention, and we do not wholly limit our claims to the exact procedure described, nor wholly to the substance specifically mentioned.

We claim:

1. The herein described process which comprises forming a dispersion of a hydrophilic colloid and rubber with the rubber in the continuous phase, and thereafter inverting the phase of said dispersion by bringing the hydrophilic colloid into the continuous phase.

2. The process of dispersing rubber into a hydrophilic colloidal substance which comprises dispersing a hydrophilic colloid in a mass of rubber and thereafter inverting the phase of said dispersion by mastication with an aqueous substance.

3. The process herein described which comprises forming a dispersion of a hydrophilic colloid paste and rubber with the rubber in the continuous phase, and thereafter inverting the phase of said dispersion by mastication with a hydrophilic colloid paste.

4. The herein described process which comprises forming a paste of hydrophilic colloid, masticating the paste, adding rubber thereto, while masticating, in such large amounts as to give a dispersion of the hydrophilic colloid in the rubber, and thereafter inverting the phase of the dispersion to bring the hydrophilic colloid into the continuous phase.

5. The herein described process which comprises forming a dispersion of a nitrogenous hydrophilic colloid and rubber with the rubber in the continuous phase, and thereafter inverting the phase of said dispersion by bringing the hydrophilic colloid into the continuous phase.

6. The herein described process which comprises forming a dispersion of a casein paste and rubber with the rubber in the continuous phase, and thereafter inverting the phase of said dispersion by bringing the casein paste into the continuous phase.

7. The herein described process which comprises forming a paste of a nitrogenous hydrophilic colloid, masticating the paste and adding rubber thereto, while masticating, in such large amounts as to produce a dispersion of the paste in the rubber, and thereafter inverting the phase of the dispersion to bring the paste into the continuous phase.

8. The herein described process which comprises forming a paste of a substance selected from a group consisting of glue, casein and gluten, masticating the paste and adding rubber thereto, while masticating, in such large amounts as to produce a dispersion of the paste in the rubber, and thereafter inverting the phase of the dispersion to bring the paste into the continuous phase.

9. The herein described process which comprises incorporating into a mass of rubber compounding ingredients, forming a viscous paste of a hydrophilic colloid, masticating the paste and adding the rubber thereto, while masticating, in such large amounts as to produce a dispersion of the paste in the rubber, and thereafter inverting the phase of the dispersion to bring the paste into the continuous phase.

10. The herein described process which comprises incorporating into a mass of rubber compounding ingredients, forming a viscous paste of a substance selected from a group consisting of glue, casein and gluten, masticating the paste and adding the rubber thereto, while masticating, in such large amounts as to produce a dispersion of the paste in the rubber, and thereafter inverting the phase of the dispersion to bring the paste into the continuous phase.

11. The herein described process which comprises incorporating into the rubber a tacky softener, forming a viscous paste of hydrophilic colloid, masticating the paste and adding the rubber thereto, while masticating, in such large amounts as to produce a dispersion of the paste in the rubber, and thereafter inverting the phase of the dispersion to bring the paste into the continuous phase.

12. The herein described process which comprises incorporating into the rubber a tacky softener, forming a viscous paste of a substance selected from a group consisting of glue, casein and gluten, masticating the paste and adding the rubber thereto, while masticating, in such large amounts as to produce a dispersion of the paste in the rubber, and thereafter inverting the phase of the dispersion to bring the paste into the continuous phase.

In witness whereof we have hereunto set our hands, said HARLAN L. TRUMBULL this 17th day of March, 1926, and said JOHN B DICKSON this 24th day of March, 1926.

HARLAN L. TRUMBULL.
JOHN B. DICKSON.